United States Patent [19]
Roman et al.

[11] Patent Number: 5,806,951
[45] Date of Patent: Sep. 15, 1998

[54] MULTI-SUBSTRATE GOBO

[75] Inventors: Brian P. Roman; Rebecca A. Kittrell, both of Austin, Tex.

[73] Assignee: High End Systems, Inc., Austin, Tex.

[21] Appl. No.: 702,814

[22] Filed: Aug. 26, 1996

[51] Int. Cl.⁶ .................................................. G03B 21/14
[52] U.S. Cl. ................................ 353/84; 353/30; 353/62
[58] Field of Search ........................... 353/30, 31, 62, 353/80, 84, 42, 22, 20, 120; 359/580, 589, 590

[56] References Cited

U.S. PATENT DOCUMENTS

| | | | |
|---|---|---|---|
| 3,451,877 | 6/1969 | Herschman | 428/389 |
| 3,597,069 | 8/1971 | Heinonen | 353/84 |
| 4,779,176 | 10/1988 | Bornhorst | 362/223 |
| 4,800,474 | 1/1989 | Bornhorst | 362/319 |
| 4,891,738 | 1/1990 | Richardson et al. | 362/282 |
| 4,931,315 | 6/1990 | Mellor | 359/589 |
| 5,217,832 | 6/1993 | Joslin et al. | |
| 5,254,202 | 10/1993 | Kaplan | 359/589 |
| 5,364,498 | 11/1994 | Chen | 216/24 |
| 5,371,543 | 12/1994 | Anderson | 359/589 |
| 5,430,629 | 7/1995 | Belliveau et al. | 362/293 |

OTHER PUBLICATIONS van Milligen et al. "Non-degrading Color Transparencies" 15 Feb. 1985, pp. 461–463, vol. 24, No. 4, Applied Optics.

*Primary Examiner*—William Dowling

[57] ABSTRACT

An acid etched gobo for producing a predetermined, multi-colored light pattern which is formed by first and second substrates having abutting planar surfaces secured together. Each of the planar surfaces includes a complimentary portion of the predetermined, multi-colored light pattern, acid etched in a coating deposited on the planar surfaces. At least one of the coatings is a dichroic coating.

4 Claims, 2 Drawing Sheets

MULTI-SUBSTRATE GOBO

FIELD OF INVENTION

This invention relates generally to stage and entertainment lighting and more particularly to projecting light produced images by passing a beam of light through a multi-colored light pattern generator or gobo including bonded substrate layers, used in a light fixture for producing colored light patterns.

BACKGROUND OF THE INVENTION

Presently, single substrate, multi-colored gobos are produced by laser etching of a ceramic coated glass substrate. The laser etching establishes the pattern in the ceramic coating, after which colored gels are baked into the pattern to produce the desired results.

Limitations to this process include high cost, very low resolution of the patterns, incapable of producing photo quality patterns, and a limit on the size of the gobos which can be produced.

Another process paints colored patterns on a glass substrate. However, these painted gobos are very limited in their heat tolerance when the gobo is placed in a lighting projection system.

The foregoing illustrates limitations of the known prior art. Thus it is apparent that it would be advantageous to provide an alternative directed to overcoming one or more of the limitations as set forth above. Accordingly, a suitable alternative is provided including features and benefits more fully disclosed hereinafter.

SUMMARY OF THE INVENTION

In one aspect of the present invention, this is accomplished by providing an acid etched gobo for producing a multi-colored light pattern comprising a first substrate having a planar surface and a coating deposited thereon. A first light pattern is formed in the coating in response to a first predetermined, patterned acid etching of the coating. A second substrate has a planar surface abutting the first substrate planar surface. A dichroic coating is deposited on the second substrate. A second light pattern is formed in the dichroic coating in response to a second predetermined, patterned acid etching of the dichroic coating, whereby the abutting patterned etchings of the first and second substrates cooperatively form the predetermined, multi-colored light pattern.

In another aspect of the present invention, this is accomplished by providing an acid etched gobo for producing a predetermined, multi-colored light pattern comprising first and second substrates having abutting planar surfaces secured together. Each planar surface has a complimentary portion of the predetermined multi-colored light pattern, acid etched in a coating thereon. At least one of the coatings is a dichroic coating.

The foregoing and other aspects will become apparent from the following detailed description of the invention when considered in conjunction with the accompanying drawing figures. It is to be expressly understood, however, that the figures are not intended as a definition of the invention, but are for the purpose of illustration only.

BRIEF DESCRIPTION OF THE DRAWING FIGURES

DETAILED DESCRIPTION OF THE INVENTION

Figure 1:
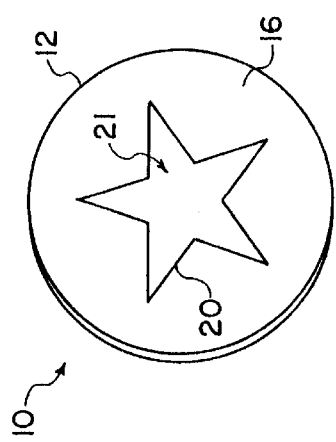
FIG. 1 is a perspective view illustrating an embodiment of a first substrate of the gobo of the present invention.
Figure 5:
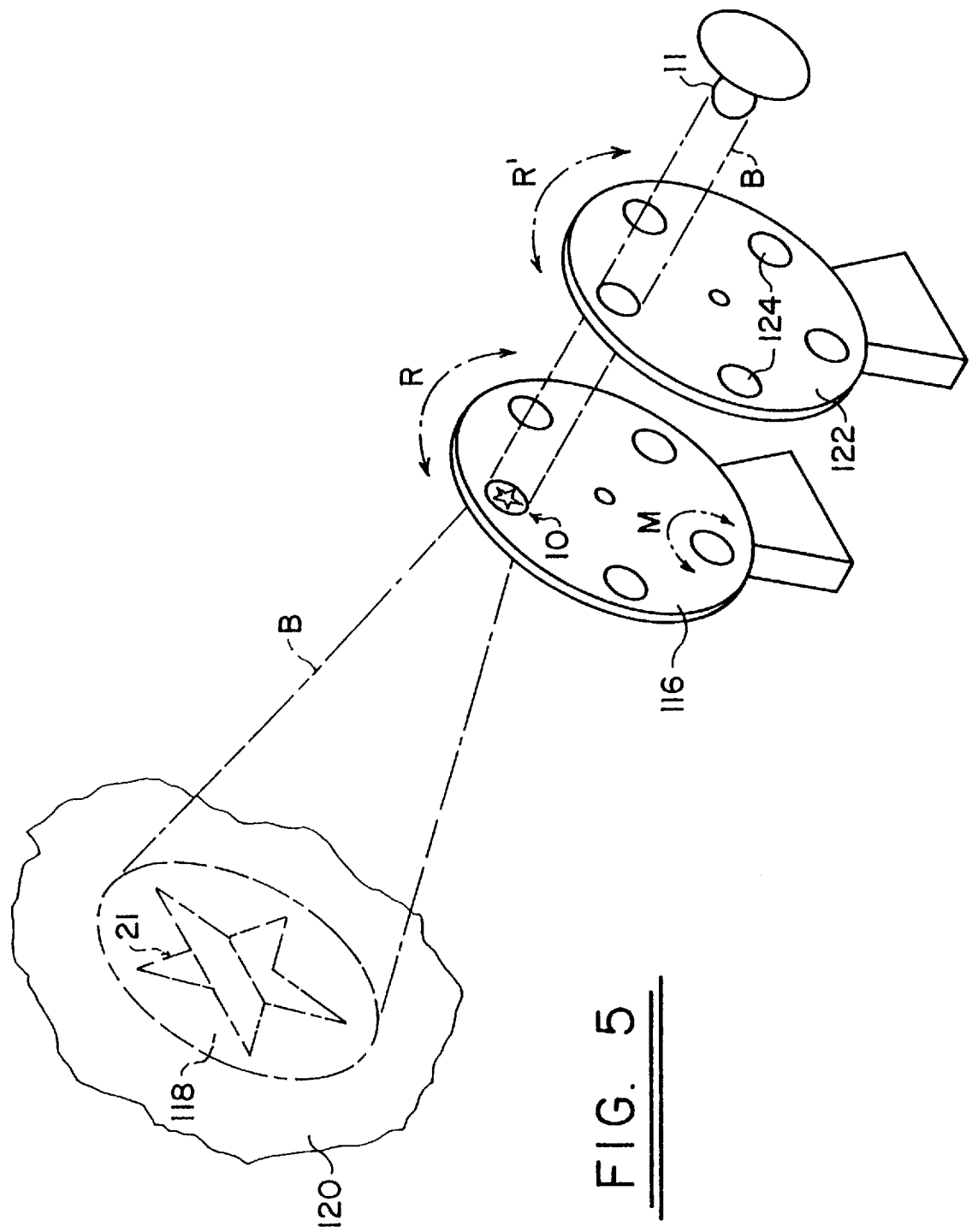
FIG. 5 is a schematic view illustrating the gobo movably mounted in a projected light path.

An acid etched gobo 10, FIG. 1, produces a predetermined, multi-colored light pattern. Gobo 10 comprises a first substrate 12 and a second substrate 14 having abutting planar surfaces 16, 18, respectively, secured together. Each planar surface 16, 18 includes a complimentary portion of the predetermined, multi-colored light pattern, acid etched in a coating on each surface 16, 18. At least one of the coatings is a dichroic coating which will be discussed more fully below.

The substrates 12, 14 are preferably of a borosilicate glass. Substrate 12 includes a planar surface 16 which has a coating 20 which may be aluminum or a dichroic film. A dichroic coating, as it is known, comprises alternating films of the metal oxides, silicon dioxide and titanium dioxide. The color effects of dichroic films are dependent on the thickness and total number of alternating layers.

For purposes of this example, aluminum coating 20 on surface 16 can be etched to reveal a predetermined pattern, e.g. a star 21. This pattern is accomplished by applying a suitable photoresist to the coating 20 and a mask portraying the star applied to the photoresist. The masked substrate 12 is exposed to ultraviolet light, then removed. The exposed substrate 12 is then developed in a suitable developer solution. The developed substrate 12 is etched in a commercially available acid etch solution and the remaining photoresist is stripped from the substrate 12. The result is that the coating 20 is stripped down to the planar surface 12, leaving an outline of the star pattern formed by the remaining coating material. When projected, this appears as a multi-colored (black, white) gobo 10.

Figure 4:
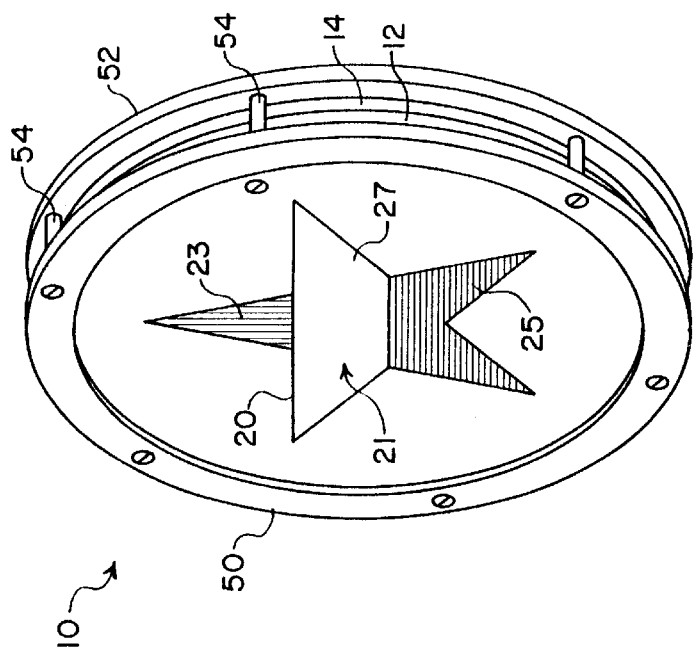
FIG. 4 is a perspective view illustrating the first and second substrates secured together.
Figure 3:
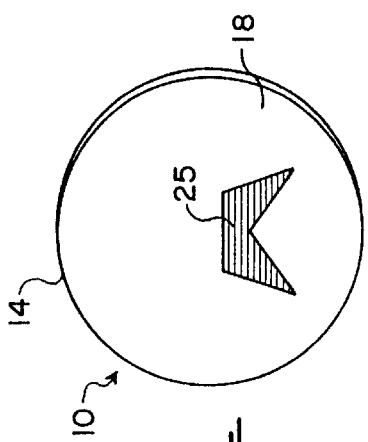
FIG. 3 is a perspective view illustrating an embodiment of a second substrate of the gobo of the present invention.
Figure 2:
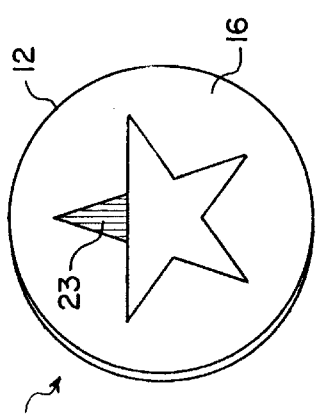
FIG. 2 is another perspective view illustrating the first substrate of FIG. 1.

If it is desired to project the star image having red, white and blue stripes, further steps are provided. Substrate 12 is further coated with a red dichroic coating 23. The etching process is repeated to etch away most of the red coating 23 except for a portion within the star outline which forms the red stripe 23, see FIG. 2.

The second substrate 14 has its planar surface 18 coated with a blue dichroic coating 25. The etching process is then repeated to etch away most of the blue coating 25 except for a portion which will form the blue stripe 25 of the star when the planar surface 18 is abutted to the planar surface 16. The white stripe 27 occurs when projected due to etching the coatings to the surface of their respective substrates. The entire star 21 is outlined with the coating 20 which projects as a black outline.

The substrates 12, 14 are secured in abutting relationship by mechanical means such as a pair of peripheral rings, 50, 52, attached together with screws 54. Other suitable means may be available to secure the substrates together.

As it is well known in entertainment lighting, the gobo 10 may be movably mounted in a gobo wheel 116, which bi-directionally rotates as indicated by the arrow designated R, so that when the gobo 10 is moved into the path of a light beam designated B, generated from a light source 11, the selected gobo image 118 is in position to be projected by the light onto a projection surface 120. Present gobos also bi-directionally rotate as indicated by the arrow designated M, independent of the wheel, once the gobo is positioned in the beam B. Also, a color wheel 122, which includes a plurality of various color discs 124, can be bi-directionally rotated as indicated by the arrow designated R' to vary color and enhance the light of beam B and the selected gobo image 118 projected on to the projection surface 120 which may be a solid surface or theatrical fog.

While this invention has been illustrated and described in accordance with a preferred embodiment, it is recognized that variations and changes may be made therein without departing from the invention as set forth in the claims.

Having described the invention, what is claimed is:

1. An acid etched gobo for producing a predetermined, light pattern comprising:
   a first substrate having a planar surface;
   a coating deposited on the planar surface of the first substrate;
   a first light pattern formed in the coating in response to a first predetermined, patterned acid etching of the coating;
   a second substrate having a planar surface abutting the first substrate planar surface;
   a dichroic coating deposited on the planar surface of the second substrate; and
   a second light pattern formed in the dichroic coating in response to a second predetermined, patterned acid etching of the dichroic coating, whereby the abutting patterned etchings of the first and second substrates cooperatively form the predetermined, light pattern.

2. The gobo as defined in claim 1, further comprising:
   a dichroic coating deposited on the acid etched first substrate; and
   a third light pattern formed in the dichroic coating on the acid etched first substrate in response to a third predetermined, patterned acid etching of the dichroic coating on the first substrate.

3. The gobo as defined in claim 2, further comprising:
   a second dichroic coating deposited on the acid etched second substrate; and
   a fourth light pattern formed in the second dichroic coating on the acid etched second substrate in response to a fourth predetermined, patterned acid etching of the second dichroic coating on the second substrate.

4. An acid etched gobo for producing a predetermined, multicolored light pattern comprising:
   first and second substrates having abutting planar surfaces secured together;
   each planar surface having complimentary portions of the predetermined, multi-colored light pattern, acid etched in a coating thereon; and
   at least one of the coatings being a dichroic coating.

* * * * *